May 30, 1961 P. S. WILLIAMS 2,986,722
RECORDING AND REPRODUCING SEISMIC SIGNALS
Filed Oct. 12, 1954 3 Sheets-Sheet 1

Philip S. Williams
   Inventors

By W. N. Wright Attorney

Philip S. Williams
Inventors

By W. N. Wright Attorney

May 30, 1961  P. S. WILLIAMS  2,986,722
RECORDING AND REPRODUCING SEISMIC SIGNALS
Filed Oct. 12, 1954  3 Sheets-Sheet 3

Philip S. Williams
Inventors
By W. N. Wright Attorney

United States Patent Office 2,986,722
Patented May 30, 1961

2,986,722

RECORDING AND REPRODUCING SEISMIC SIGNALS

Philip S. Williams, Tulsa, Okla., assignor, by mesne assignments, to Jersey Production Research Company Filed Oct. 12, 1954, Ser. No. 461,811

19 Claims. (Cl. 340—15)

This invention concerns a method and an apparatus for recording seismic signals wherein an intermediate memory stage is employed in the chain of amplifying, filtering, and volume controlling steps so that specialized and variable filtering for optimum utilization of the seismic information is made possible with a minimum of equipment. More particularly the invention concerns the recording of seismic signals on a plurality of channels simultaneously and the playing back and re-recording of the signals one channel at a time on a visible record while maintaining an absolute tie-in between channels.

The general method of seismic exploration, wherein a seismic disturbance is initiated at a selected point in the earth and reflected seismic waves are detected at a plurality of points spread out in a desired pattern, has long been known. Briefly the method consists in picking up the detected waves with sensitive detectors known as geophones, which translate the detected motion into electrical impulses, which, after amplification, are recorded on a seismograph. The conventional seismograph record comprises a paper or film carrying a plurality of wave forms or traces representative of the seismic waves that have been picked up by the individual geophones, suitably amplified, and fed to recording galvanometers. These traces are essentially rectangular coordinate graphs of geophone velocity (or displacement, or acceleration, depending on the type of geophone used) versus time. The record is provided by well known means with suitable timing marks so that when the seismograph record, or seismogram, is later examined it is possible to determine the length of time required for the arrival of seismic waves at any particular point on the earth's surface either directly from the source or by reflection from underlying strata. From other data obtained in the area being studied, such as seismic wave velocities in the various earth layers, it is then possible to estimate the depths of the various reflecting substrata.

In the development of the seismic method of prospecting through the years many refinements of equipment have been made, particularly in the direction of providing elaborate filter networks for the seismis amplifiers so that a particular filter can be selected that is best suited for suppressing unwanted signals in the particular locality being profiled. These latter signals include high-frequency noises such as wind noise and low-frequency noise such as what is commonly called "ground roll." Modern seismograph amplifiers have therefore become very complicated and expensive and correspondingly bulky. At the same time the problem has arisen of designing portable equipment without sacrificing the high quality of the conventional truck-mounted equipment. The need for portability has been brought about by the increasing amount of seismic exploration being conducted in previously unexplored and largely inaccessible areas.

It is one object of the present invention to provide seismic recording methods and equipment that will afford the convenience and versatility of elaborate filtering and amplifying circuits for seismic recording while at the same time utilizing compact portable equipment. It is another object of the invention to provide seismic recording equipment that has the advantage of portability without sacrificing recording quality.

It is still another object of the invention to provide equipment that will prepare a seismis record in reproducible form that may be played back in the field so that the operator can determine whether a satisfactory record has been obtained and that can later be played back many times at a central office using various conditions of filtering and compositing to obtain an optimum usable record.

In accordance with the present invention the seismic signals received from a conventional spread of geophones are amplified by simple preamplifier circuits and recorded simultaneously side by side as separate channels on a magnetic tape or equivalent magnetic storage medium mounted on a drum. To obtain a visible record in the field the magnetically recorded traces are played back one at a time through a single high-quality amplifier. Since the larger part of the filtering and automatic volume control is provided in the playback amplifier, the preamplifiers are small and simple. Thus comparing the equipment of the present invention providing for, say 24 recording channels, 24 elaborate seismic amplifiers are replaced by 24 small elementary amplifiers plus one elaborate amplifier, thus greatly simplifying the problem of portability.

In the equipment of the present invention the supporting drum for the magnetic tape and the supporting drum for the reproduced seismic record are integrally connected to provide positive tie-in between channels when the record is played back a channel at a time. Playback of the magnetic record is entirely automatic and the magnetic channels are reproduced consecutively, one for each rotation of the drum. After each rotation of the drum, the input of the playback amplifier is automatically switched to the next magnetic channel. The playback amplifier drives a recording pen which records the visible traces on an endless paper belt and means are provided for automatically moving the pen into a new trace position during each rotation of the drum so that the visual traces will be positioned side by side in proper time relation as on the conventional seismogram.

A timing signal is also recorded on the magnetic drum along with the signal channels during the initial recording of the seismic signals. This timing signal is then played back simultaneously with each signal channel and time lines are printed along each trace position on the final record, thus providing a check on any variations in drum speed that might occur during playback. Since the final record is made up of ink recorded traces and timing lines, the use of chemicals and equipment required for photograhpic developing of conventional records is eliminated, thus also contributing to the portability of the equipment.

The nature and objectives of the invention will be more fully appreciated when reference is made to the accompanying drawing in which.

Figure 1:
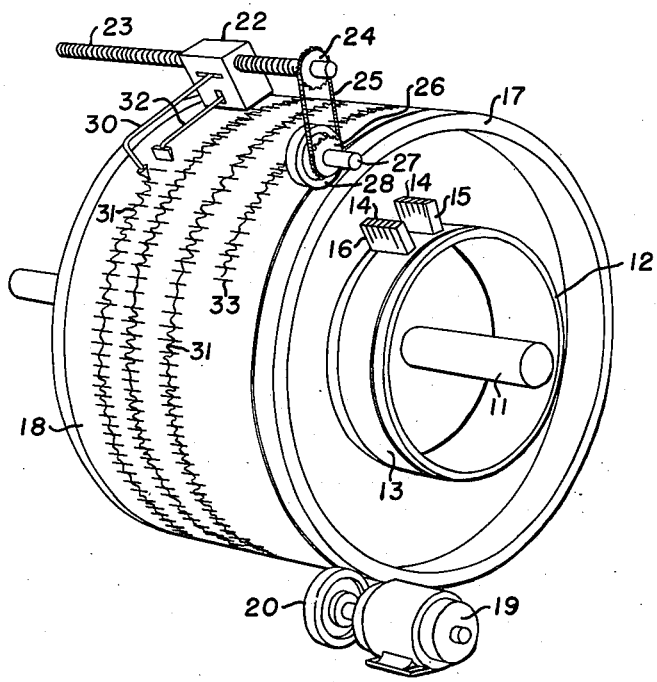
Figure 1 is a perspective view of the essential structural portions of one form of recording and reproducing drum useful in practicing this invention.

Referring first to Figure 1, the essential structural elements of one form of recording and reproducing apparatus suitable for practicing this invention are shown in perspective. In order to simplify the illustration, the supporting members are not shown. The fundamental functions of these structural elements are represented in the block diagram of Figure 2. Suitably supported on a rotatable shaft 11 is a drum 12 to which a magnetic recording tape 13 may be fastened and a drum 17 to which a strip of recording paper 18 may be fastened. The two drums should be integrally connected to provide a proper tie-in between traces when the record is played back. Conveniently, the two drums may be cast as an integral unit and the drums are preferably made of light weight material such as an aluminum alloy. The drums can be rotated at costant speed by means of a suitably controlled electric motor 19 having a driving wheel 20 that frictionally engages the surface of one of the drums.

The same magnetic heads are used both for recording and reproducing the seismic signals. The supporting means (not shown) for the recording heads will be arranged so that the heads may be raised from the tape drum 12 in order to facilitate application of the magnetic tape to the drum. Preferably the magnetic heads 14 are arranged in two separate banks 15 and 16, arranged in close proximity as shown in Figure 1, the heads in one bank being staggered with respect to the heads in the other bank so that the channels recorded by one bank of heads will lie intermediate the channels recorded by the other bank of heads. Thus the first head in bank 15, for example, may record the first channel on the tape, the first head in bank 16 may record the second channel, the second head in bank 15 may record the third channel and so on. This arrangement will permit twenty-eight separate signal channels to be recorded on a magnetic tape two inches wide.

Thus it is possible to record simultaneously on the respective channels twenty-four frequency modulated seismic signals, one amplitude recorded cap break signal, one amplitude recorded up-hole seismic signal and two amplitude recorded frequency standard time signals. By recording one time signal on each of the outermost channels of the magnetic tape the two time signals can be checked against each other, if necessary, during playback to ensure that the magnetic tape has not become skewed on the drum, which obviously would introduce errors in computing the seismic record. The recording of the times at which the make and break in the firing circuit occur and the time at which an impulse is received by the up-hole geophone, that is a geophone placed near the shot hole, are common in the seismic prospecting art and for the purpose of computation of the seismic record and need not be elaborated upon here.

For the playback or re-recording step, the reproduced signal drives a pen motor that causes a pen to make a permanent ink record of the signal on high quality paper. The pen 30 and its associated pen motor are carried by a pen carriage 22 that is driven laterally of the record paper by a lead screw 23. The latter is rotated by a sprocket 24 which in turn receives its rotation from a second sprocket 26 through a chain 25. The second sprocket 26 is driven by a wheel 28 supported on a shaft 27, the latter being supplied with means (not shown) to move the wheel into and out of frictional engagement with the drum 17. The gear ratio between the drum 17 and the lead screw 23 is such that the pen carriage moves across the drum 17 in a direction parallel to the shaft 11 a prescribed distance for each rotation of the drum. The pen carriage also supports a second recording arrangement comprising a stylus 32 that prints a plurality of time lines 33 coincident with the trace 31 made by the pen 30. Again for simplicity, the flexible tubes that supply ink to the pen and stylus are not shown.

Figure 2:
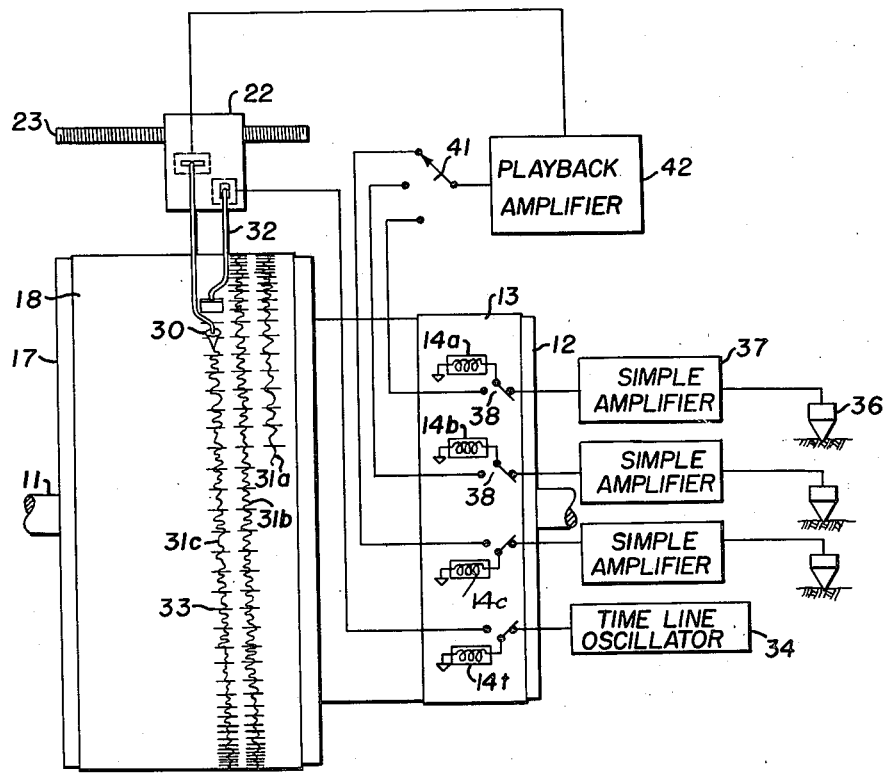
Figure 2 is a schematic diagram showing in simplified form the operation of the recording and reproducing system of this invention.

The operation of the apparatus of Figure 1 may be briefly explained by reference to the block diagram of Figure 2. The seismic signals picked up by the several geophones 36 are amplified by the simple amplifier circuits 37, which also frequency modulate the signals, and the modulated and amplified signals are recorded as separate traces on the magnetic tape by means of the recording heads 14. Four of the heads 14a, 14b, 14c and 14t are indicated, the first three representing seismic signal channels and the fourth a time trace channel, the signal for the latter being obtained from oscillator 34. The latter may be a fork-controlled oscillator that furnishes an unmodulated 100 cycle sine wave.

To obtain a visible record the switches 38 are thrown to the reproduce position and the magnetically recorded traces are played back one at a time through a single demodulator and high quality amplifier 42. A sequence switch 41 automatically switches the input of the playback amplifier 42 to the next magnetic channel, i.e. from head 14a to head 14b and so on, each time the drum makes one rotation. During this same rotation of the drum the pen carriage is advanced one trace width across the paper. Since the paper drum 17 and the magnetic tape drum 12 are rigidly connected, the visual traces 31a, 31b, etc., are positioned side by side in proper time relation. Actually the visual traces comprise a single continuous spiral trace.

Figure 3:
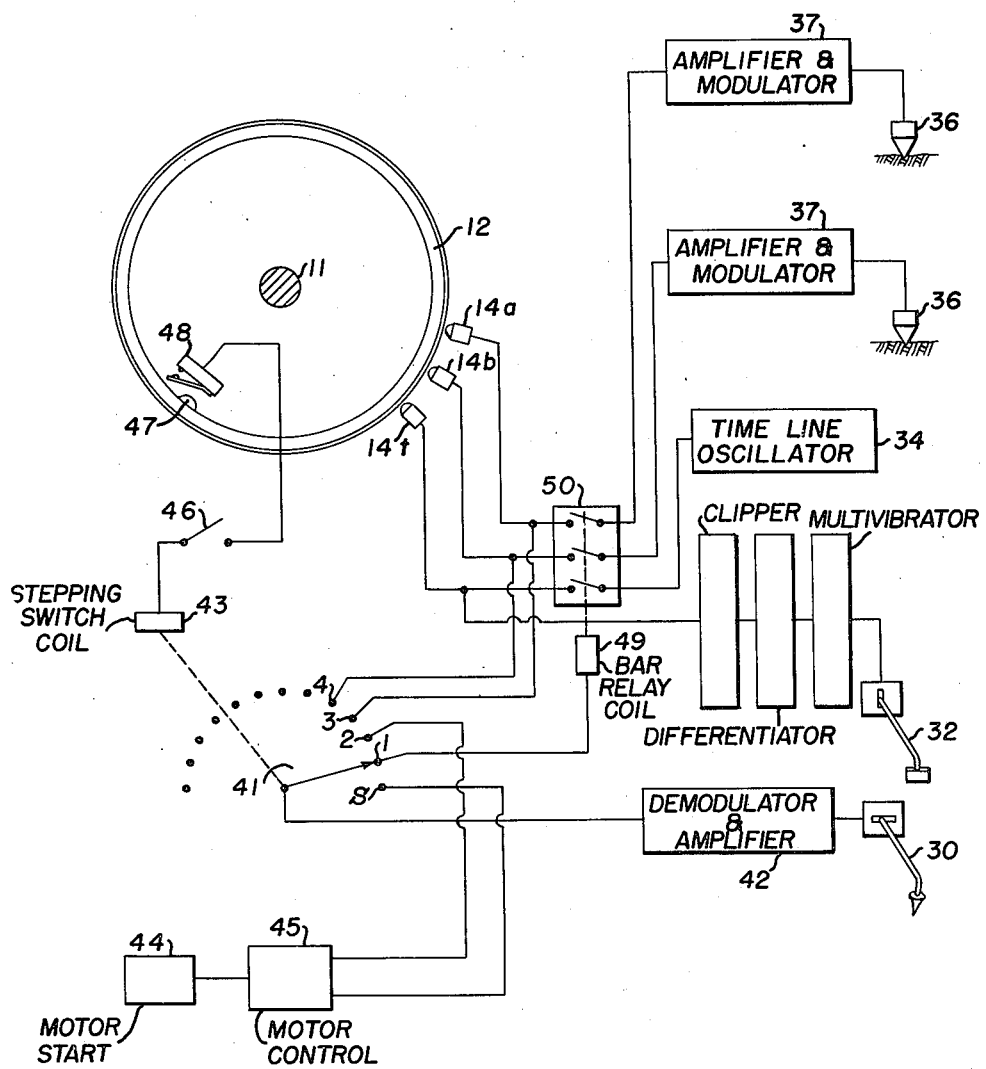
Figure 3 is a schematic circuit diagram illustrating the sequence of operations occurring during the playing back of the magnetic records.

A more detailed understanding of the operation of the recording and reproducing apparatus of this invention can be obtained by referring to the schematic circuit diagram of Figure 3. The sequence of operations is controlled by a stepping switch 41 driven by a relay 43. When the apparatus is ready for the recording step, the stepping switch 41 is in position S. When the operator wishes to record seismic signals, the recording drum is caused to rotate at a predetermined speed. Conveniently the operation of the motor 19 is controlled by a motor control circuit 45 that is so designed, as by use of relays, that when a motor start switch 44 is actuated the motor will start and when an impulse is received from the stepping switch 41 the motor will be stopped. The control circuit 45 is also preferably supplied with means for operating the motor at different speeds so that, if desired the drum can be rotated at a slower speed during playback than during recording. The control circuit 45 also preferably includes a servo system for accurate control of the rotational speed of the drum. For example motor 19 may be a permanent magnet motor. An electric tachometer can be connected directly to the motor shaft to generate a direct current voltage that is proportional to the speed of the motor. The latter voltage can be compared to a standard direct current voltage and the difference between the two voltages can be used to control a vacuum tube from which the motor 19 obtains its power. Since such servo systems are well known and since the use of relays for starting and stopping a motor are also well known, specific illustration of control circuit 45 is not deemed necessary.

As already stated, when it is desired to make a seismic record the recording drum is set in motion. This is done by actuating motor start switch 44. Then at the discretion of the operator a "ready" switch 46, which is in series with the operating relay 43 of the stepping switch, is closed. This completes an electrical circuit through the ready switch, the stepping switch, and the normally open microswitch 48. When the drum rotates to such a position that the cam 47 on the drum engages and closes the microswitch 48, the circuit to the stepping switch is completed, thus pulsing the stepping switch relay 43, and the stepping switch contacts are advanced to position No. 1. Contact No. 1 of the stepping switch closes an electrical circuit through the bar relay coil 49 and causes the normally open bar relay 50 to close. The bar relay when closed connects each of the separate recording heads 14 to their respective amplifiers 37 and also connects the recording head 14t for the timing pulse to the time line pulse source 34. The seismic shot is then fired independently during the first rotation of the drum. If the drum turns at a speed of about one rotation in four seconds and the operator fires the shot within one second after the stepping switch has been pulsed, a record approximately three seconds in length can be obtained, which is adequate for most seismic work. At the end of the particular rotation of the drum during which the recording is made, microswitch 48 is again engaged by the cam 47 which causes the stepping switch contacts to move into position No. 2. This causes the electrical circuit to the bar relay coil 49 to be broken so that the bar relay 50 then opens and the recording heads are disconnected from their respective signal sources. The stepping switch in position No. 2 also actuates the motor control circuit 45 to stop the motor and thereby stop the rotation of the drum.

After the recording cycle has been completed the stepping switch is in position to start the playback cycle. To reproduce the recorded signal the drive motor is again started by closing the switch 44 and the drum is set in motion. The pen carriage 22 is placed in its proper position and the recording pen and the time line printer 32 are lowered to contact with the paper and the circuit to the stepping switch is completed by closing the "ready" switch 46. During the next rotation of the drum the stepping switch is pulsed by the action of the cam 47 and microswitch 48 and the contacts of the stepping switch advance to position No. 3. This connects the first channel of the magnetic heads, designated in the diagram in Figure 3 as head 14a, to the input of the playback demodulator and amplifier 42 where the signal is demodulated, amplified, and filtered and then fed to the recording pen 30 which traces the seismic signal onto the paper as an ink record. Amplifier 42 is preferably provided with a plurality of filters and a selector switch as in conventional seismic amplifiers.

After one rotation of the drum the microswitch 48 is again closed momentarily by the cam 47 which causes the stepping switch to move into position No. 4. This action disconnects head 14a and connects head 14b, representing the second channel of the magnetic record, to the input of the demodulator and playback amplifier 42. For each additional rotation of the drum the stepping switch is advanced to the next position until all of the channels have been played back. At this time the stepping switch will have moved around to position S which actuates the motor control circuit 45 to stop the motor and thus the rotation of the drum.

As previously described, during each rotation of the drum the lead screw 23 causes the pen carriage 22 to move across the paper in a direction parallel to the drum axis a predetermined amount so that the beginning of the trace for the second recorded channel will be directly in line with and alongside of the beginning of the trace for the first recorded channel. The pen 30 may be a conventional recording pen but is preferably one that makes a rectilinear record. The recording pen described and claimed in copending application Serial No. 449,076 (now U.S. Patent No. 2,812,996 issued November 12, 1957), filed by Philip S. Williams on August 18, 1954, and entitled "Rectilinear Torque Driven Recording Pen," is especially suitable for the apparatus of the present invention in view of its high-frequency response characteristics.

It will be noted that the time line head 14t is at all times connected to the time line printer 32 during playback so that time lines will be printed alongside of or superimposed upon the trace for each channel. The 100 cycle sine wave that has been recorded on the time line channel is clipped by clipper circuit 53 and peaked by differentiating circuit 54 to drive a one-shot multivibrator 55, the latter then giving a repeated pulse of constant height and width to drive the time line printer 32 which is essentially a stylus fastened to a lever that is reciprocated by an electromagnet.

The recording and playback system and method of this invention have a number of advantages. First of all, the ability to use very simple frequency modulated amplifiers without filters greatly reduces the volume and weight of the equipment when compared with standard seismic amplifiers. Since the seismic signal is reproduced only one channel at a time, the reproducing amplifier can be made very elaborate without greatly increasing the overall weight of the equipment. The overall weight is also minimized by the fact that no photographic apparatus is necessary. Another advantage of this invention is that since the seismic signal is initially recorded without the use of filters a high fidelity magnetic tape record is obtained which contains all of the complicated wave forms generated by the geophones. This magnetic record can be played back an unlimited number of times without reducing, injuring, or altering the original recorded signal in any way. Thus the original record can be played back through various types of amplifiers, filters, compositing devices, correlating devices, correcting devices and conventional or special seismograph recorders to obtain any desired variation that may be considered necessary for proper treatment of the final record.

Since the drum supporting the magnetic record and the drum supporting the paper on which the final visible record is made are integrally connected there is a positive tie-in between the original record and the reproduced record. Furthermore, since the recording pen carriage is automatically advanced continuously during the playback cycle, no interruption of the playback cycle is necessary to shift the recording pen for each trace. Also positive control of timing information is obtained by the continuous printing of time lines during the entire playback cycle.

The system of this invention also makes possible the simplification of the problem of eliminating stray signals of an unwanted character such as the 60 cycle A.C. interference that is frequently picked up from power transmission lines located in the vicinity in which the seismic survey is being made. In conventional practice, power-line interference on a seismograph record may be reduced or eliminated by the following procedure carried out on a channel-by-channel basis: a signal derived from the power line, say through capacitative coupling, is adjusted in phase and amplitude until, when fed into the channel, it more or less exactly opposes and hence cancels the undesired interference. This requires a phase and amplitude control circuit, and a manual adjustment, for each of the channels, which may be twenty-four or more in number.

With the apparatus of the present invention it is merely necessary to record on one of the magnetic record channels, during the simultaneous recording of the seismic signals, a single signal derived from the power line. Thus the signal is "keyed" to the power-line interferences occurring with these signals, in that the phase and amplitude relations prevailing between them depend on what actually existed during the recording. Then in the channel-by-channel playback the reference signal can be adjusted in phase and amplitude for cancellation of interference. Thus only one "bucking" circuit is used, instead of one for each channel.

It is of course contemplated that the scope of this invention not be limited to the specific embodiments described, as obvious modification thereof will occur to persons skilled in the art. Thus for example in place of the mechanical cam and microswitch arrangement 47, 48 of Figure 3 a light-shutter type of current closer can be used wherein the cam 47 would be replaced by an opaque mask that would interrupt a light beam directed into a photocell.

What is claimed is:

1. An apparatus for preparing a visible seismic record comprising, in combination, a first rotatable drum adapted to receive and support a magnetic record medium, a plurality of magnetic heads arranged adjacent said drum in a manner to impress a plurality of side-by-side magnetic traces simultaneously on said record medium, a second rotatable drum integrally connected to said first drum and adapted to support a record chart thereon, means for rotating said drums at a constant speed, a recording pen supported adjacent said second drum in a manner adapted to place said pen in contact with said chart, means for advancing said pen a fixed distance laterally of said chart for each rotation of said second drum, means for driving said pen in response to an electrical signal, an electrical circuit for supplying electrical signals from said magnetic heads to said pen driving means, and switching means actuated by the rotation of said drum to switch selected magnetic heads into and out of said circuit.

2. Apparatus as defined by claim 1 including means for supplying a standard frequency signal to one of said magnetic heads whereby to furnish a reference time signal on at least one channel of said recording medium, marking means positioned adjacent said recording pen to impress on said chart adjacent the trace made by said pen a plurality of marks indicative of said time signal and means for supplying said time signal to said marking means from said magnetic head.

3. Apparatus as defined by claim 1 wherein said pen advancing means comprises a threaded rod, a pen carriage threadedly engaging said rod and means for rotating said rod in proportion to the rotation of said drum, whereby said pen will produce a continuous spiral trace on said chart as said drum rotates.

4. Apparatus as defined by claim 1 including an amplifier and filter network in the electrical circuit supplying electrical signals from said magnetic heads to said pen driving means.

5. An apparatus for recording and reproducing a plurality of seismic signals received simultaneously from a spread of seismic detectors which comprises a first drum rotatable about its axis and adapted to receive and support a magnetic record medium on its peripheral surface, a second drum rotatable about its axis and adapted to receive and support a visual record medium on its peripheral surface, means to rotate said first and second drums, means to integrally connect said drums so as to maintain a fixed relation between said magnetic record medium and said visual record medium, means to record said seismic signals simultaneously as separate magnetic traces in a side-by-side relation on said magnetic record medium, means for successively and separately reproducing each magnetic trace, visual recording means adjacent said second rotatable drum and operable in response to each reproduced trace to form a corresponding visible trace on said visual record medium, and drive means operable to move the visual recording means along the length of said second drum a predetermined distance for the recording of each visible trace.

6. An apparatus for recording and reproducing a plurality of seismic signals received simultaneously from a spread of seismic detectors which comprises a first drum rotatable about its axis and adapted to support a magnetic record medium on its peripheral surface, a second drum rotatable about its axis and adapted to support a visual record medium on its peripheral surface, means to rotate said drums in integral connection with each other so as to maintain said magnetic record medium and said visual record medium in fixed relation, a plurality of magnetic heads disposed along and adjacent said first drum, recording circuit means operable with said heads to record the seismic signals received from the seismic detectors simultaneously as separate side-by-side magnetic traces on said magnetic record medium, playback means operable to sequentially and separately reproduce the seismic signals from the magnetic traces, recording means mounted adjacent said second drum and operable with said playback means to form a visible trace on the visual record medium in response to each reproduced seismic signal, and means to move the visual recording means along the length of said second drum with the reproduction of each seismic signal from the magnetic traces so as to record the visible traces formed on the visual record medium in a side-by-side relation.

7. An apparatus for recording and reproducing a plurality of seismic signals received simultaneously from a spread of seismic detectors which comprises a first drum rotatable about its axis and adapted to support a magnetic record medium around its peripheral surface, a second drum rotatable about its axis and adapted to support a visual record medium around its peripheral surface, means to integrally connect both drums so as to maintain a fixed relation between said magnetic record medium and said visual record medium, means to rotate said first and second drums, a plurality of magnetic heads disposed along and mounted adjacent said first drum, first circuit means including an amplifier for each magnetic head operable to transmit each seismic signal received from said spread of detectors to a separate one of said magnetic heads, visual recording means adjacent said second drum and adapted to form a visible trace on said visual record medium, multiple contact position switching means operable in one position to connect said magnetic heads through said first circuit means to said spread of seismic detectors in a manner to record said seismic signals simultaneously as separate side-by-side magnetic traces on said magnetic record medium, second circuit means including amplifying and filtering means operable with each magnetic head and said visual recording means to reproduce a seismic signal recorded by the magnetic head as a magnetic trace on said magnetic record medium and to re-record the signal as a visible trace on the visual record medium, said switching means operable upon successive rotations of said first and second drums to take contact positions successively connecting said magnetic heads through said second circuit means to said visual recording means, and drive means for moving said visual recording means along said second drum simultaneously with the reproduction of said magnetic traces.

8. Recording apparatus for geophysical prospecting comprising a plurality of magnetic recording and reproducing playback head means, a multichannel magnetic record mounted for movement past said magnetic head means during a magnetic recording interval for the simultaneous recording on said magnetic record of geophone signals to respective ones of the head means and for repeat movement past the magnetic head means following the magnetic recording interval for the reproduction of the magnetically recorded signals, pen recorder means, a multichannel visual record chart mounted for movement repeatedly past said pen recorder means following the magnetic recording interval, means for connecting said pen recorder means sequentially to individual ones of said magnetic head means upon successive repeat movements of said magnetic record and said visual record chart past said magnetic head means and said pen recorder means, respectively, to sequentially reproduce on said visual record chart the individual magnetic recordings at the respective channels on the magnetic record, and drive mechanism for moving said magnetic record and said visual record chart together in physical synchronism during said repeat movements thereof to maintain among the signal reproductions on the visual record chart at the several channels thereon the same time relationship as among the recorded signals at the several channels on the magnetic record.

9. Recording apparatus for geophysical prospecting, comprising a plurality of magnetic recording and reproducing heads, a multichannel magnetic record movable past said heads, a pen recorder, a multichannel visual record chart movable past said pen recorder, said magnetic record and said visual record chart being mounted for movement together in physical synchronism repeatedly past said magnetic heads and said pen recorder, respectively, means for supplying seismic signals to said magnetic heads as the magnetic record moves past said heads during a magnetic recording interval, means operative following the completion of the magnetic recording interval for moving said magnetic record and said visual record chart repeatedly past said magnetic heads and said pen recorder, respectively, means operative during the repeat movements of the magnetic record past the magnetic heads and the visual record chart past the pen recorder for electrically connecting the pen recorder in succession to the magnetic heads individually for reproduction by the pen recorder on the visual record chart of the individual magnetic recordings, and means operative upon said repeat movements of the magnetic record and the visual record chart to index the pen recorder successively from one channel to the next across the visual record chart.

10. Apparatus for recording a plurality of transient signals, comprising a plurality of magnetic recording and reproducing head means, a multi-channel magnetic record mounted for movement past said magnetic head means during a magnetic recording interval for the simultaneous recording on said magnetic record of a plurality of transient signals to respective ones of the magnetic head means and for repeat movement past the magnetic head means following the magnetic recording interval for the reproduction of the magnetically recorded signals, pen recorder means, a multichannel visual record chart mounted for movement repeatedly past said pen recorder means following the magnetic recording interval, means for connecting said pen recorder means sequentially to individual ones of said magnetic head means upon successive repeat movements of said magnetic record and said visual record chart past said magnetic head means and said pen recorder means, respectively, to sequentially reproduce on said visual record chart the individual magnetic recordings at the respective channels on the magnetic record, and drive mechanism for moving said magnetic record and said visual record chart together in physical synchronism during said repeat movements thereof to maintain among the signal reproductions on the visual record chart at the several channels thereon the same time relationship as among the recorded signals at the several channels on the magnetic record.

11. Recording apparatus for geophysical exploration comprising, a plurality of magnetic recording and reproducing heads, a multichannel magnetic record means movable repeatedly past said heads, a plurality of geophone circuits adapted to be connected respectively to the magnetic heads, a pen recorder, a multichannel visual record chart movable repeatedly past said pen recorder in physical synchronism with the movement of said magnetic record means past the magnetic recording and reproducing heads, means rendering said input circuits operative to supply geophone signals to the magnetic heads as the magnetic record means moves past said heads for simultaneously recording magnetically the individual geophone signals during a magnetic recording interval, means operative following the magnetic recording interval to disconnect said input circuits from said magnetic heads, means operative following the magnetic recording interval to connect the magnetic heads in succession to the pen recorder as the magnetic record means again moves past the magnetic heads and the visual record chart moves past the pen recorder for reproducing the magnetic recordings in succession as visual pen recordings on said visual record chart which maintain the time relationship among the signals recorded magnetically, and means operative following the magnetic recording intreval to index the pen recorder from one channel to the next across said visual record chart upon successive repeat movements of said magnetic record means and said visual record chart past the magnetic heads and the pen recorder, respectively.

12. Recording apparatus for geophysical prospecting, comprising a rotary drum unit, a plurality of magnetic recording and reproducing heads mounted to extend adjacent a portion of the periphery of the drum unit, a multichannel magnetic tape mounted on said portion of the periphery of the drum unit to move past said heads, a pen recorder positiond to extend adjacent another portion of the periphery of the drum unit, a multichannel visual record chart on said other portion of the periphery of the drum unit movable past said pen recorder in physical synchronism with the movement of the magnetic tape past said magnetic heads, means for supplying geophone signals to said magnetic heads as the drum unit rotates to move the magnetic tape past the heads during a magnetic recording interval, means operative following the completion of the magnetic recording interval to rotate the drum unit repeatedly to move the magnetic tape repeatedly past the magnetic heads and to move the visual record chart repeatedly past the pen recorder, means operative during the successive rotations of the drum unit following the magnetic recording intreval to electrically connect the pen recorder in succession to the magnetic heads individually for reproduction by the pen recorder on the visual record chart of the individual magnetic recordings on the magnetic tape, and means operative upon each successive rotation of the drum unit to index the pen recorder successively from one channel to the next across the visual record chart.

13. Recording apparatus comprising a plurality of magnetic recording and reproducing playback head means, a multichannel magnetic record mounted for movement past said magnetic head means during a magnetic recording interval for the simultaneous recording on said magnetic record of transient signals to respective ones of the magnetic head means and for repeat movement past the magnetic head means following the magnetic recording interval for the reproduction of the magnetically recorded signals, visual recorder means, a multichannel visual record medium mounted for movement repeatedly past said visual recorder means following the magnetic recording interval, means for connecting said visual recorder means sequentially to individual ones of said magnetic head means upon successive movements of said magnetic record and said visual record medium past said magnetic head means and said visual recorder means, respectively, to sequentially reproduce on said visual record medium the individual magnetic recordings at the respective channels on the magnetic record, and drive mechanism for moving said magnetic record and said visual record medium together in physical synchronism during said repeat movement thereof to maintain among the signal reproductions on the visual record medium at the several channels thereon the same time relationship as among the recorded signals at the several channels on the magnetic record.

14. Recording apparatus for geophysical prospecting comprising a plurality of magnetic recording and reproducing heads, a multichannel magnetic record movable past said heads, a visual recorder, a multichannel visual record medium movable past said visual recorder, said magnetic record and said visual record medium being mounted for movement together in physical synchronism repeatedly past said magnetic heads and said visual recorder, respectively, means for supplying seismic signals to said magnetic heads as the magnetic record moves past heads during recording interval, means operative following the completion of the magnetic recording interval for moving said magnetic record and said visual record medium repeatedly past said magnetic heads and said visual recorder, respectively, means operative during the repeat movements of the magnetic record past the magnetic heads and the visual record medium past the visual recorder for electrically connecting the visual recorder in succession to the magnetic heads individually for reproduction by the visual recorder on the visual record medium of the individual magnetic recordings, and means operative upon said repeat movements of the magnetic record and the visual record medium to index the visual recorder successively from one channel to the next across the visual record medium.

15. Recording apparatus for seismic prospecting comprising a rotary drum unit, a plurality of magnetic recording and reproducing heads mounted to extend adjacent a portion of the periphery of the drum unit, a multichannel magnetic tape mounted on said portion of the periphery of the drum unit to move past said heads, a visual recorder positioned to extend adjacent another portion of the periphery of the drum unit, a multichannel visual record medium on said other portion of the periphery of the drum unit movable past said visual recorder in physical synchronism with the movement of the magnetic tape past said magnetic heads, means for supplying seismic signals to said magnetic heads as the drum unit rotates to move the magnetic tape past the heads during a magnetic recording interval, means operative following the completion of the magnetic recording interval to rotate the drum unit repeatedly to move the magnetic tape repeatedly past the magnetic heads and to move the visual record medium repeatedly past the visual recorder, means operative during the successive rotations of the drum unit following the magnetic recording interval to electrically connect the visual recorder in succession to the magnetic heads individually for reproduction by the visual recorder on the visual record medium of the individual magnetic recordings on the magnetic tape, and means operative upon each successive rotation of the drum unit to index the visual recorder successively from one channel to the next across the visual record medium.

16. Recording apparatus comprising a rotary drum unit, a multichannel magnetic record extending around the drum unit at a portion of the latter's periphery, a multichannel visual record extending around the drum unit at another portion of the latter's periphery, multichannel magnetic recording and playback head means positioned adjacent said magnetic record to record signals thereon as the drum unit rotates to move the magnetic record past said head means during a magnetic recording interval and to reproduce the recorded signals from the magnetic record upon repeat rotation of the drum unit following the magnetic recording interval, visual recorder means positioned to record on said visual record as the drum unit rotates to move the visual record past said visual recorder means, and means operative during repeat rotation of the drum unit for connecting said visual recorder means to said magnetic head means to record on the visual record the signals previously recorded on said magnetic record.

17. Recording apparatus comprising a plurality of magnetic recording and playback head means, a multichannel magnetic record mounted for movement past said magnetic head means during a magnetic recording interval for the recording on said magnetic record of input signals to the respective magnetic head means and for repeat movement past said magnetic head means following the magnetic recording interval for the reproduction of the recorded signals, a multichannel visual record medium mounted for movement in physical synchronism together with said magnetic record, visual recorder means in recording relation to said visual record medium, and means for connecting said visual recorder means to said magnetic head means during repeat movements of the magnetic record past said magnetic head means to record on the visual record medium the signals previously recorded on said magnetic record.

18. Apparatus for recording a plurality of transient signals, comprising a plurality of magnetic recording and reproducing head means, a multichannel magnetic record mounted for movement past said magnetic head means during a magnetic recording interval for the simultaneous recording on said magnetic record of a plurality of transient signals to respective ones of the magnetic head means and for repeat movement past the magnetic head means following the magnetic recording interval for the reproduction of the magnetically recorded signals, visual recorder means, a multichannel visual record medium mounted for movement repeatedly past said visual recorder means following the magnetic recording interval, means for connecting said visual recorder means sequentially to individual ones of said magnetic head means upon successive repeat movements of said magnetic record and said visual record medium past said magnetic head means and said visual recorder means, respectively, to sequentially reproduce on said visual record medium the individual magnetic recordings at the respective channels on the magnetic record, and drive mechanism for moving said magnetic record and said visual record medium together in physical synchronism during said repeat movements thereof to maintain among the signal reproductions on the visual record medium at the several channels thereon the same time relationship as among the recorded signals at the several channels on the magnetic record.

19. In a multichannel recorder, the combination of a multichannel memory device having provision for recording and reproducing individual signals on the respective channels, a multichannel visual record chart, a pen recorder mounted to record a visual trace on said visual record chart, means for moving said visual record chart repeatedly past said pen recorder, means for indexing said pen recorder from one channel to the next across said visual record chart upon successive movements of the visual record chart past the pen recorder, and means for actuating said pen recorder successively in response to the individual signals reproduced from the respective channels on said multichannel memory device to record said signals individually in succession as visual traces at successive channels on the visual record chart upon successive movements of the visual record chart past the pen recorder.

References Cited in the file of this patent

UNITED STATES PATENTS

| | | |
|---|---|---|
| 2,134,581 | Rowell | Oct. 25, 1938 |
| 2,421,834 | Crowther | June 10, 1947 |
| 2,423,340 | Pellettere | July 1, 1947 |
| 2,429,236 | Potter | Oct. 21, 1947 |
| 2,620,890 | Lee | Dec. 9, 1952 |
| 2,672,944 | Minton | Mar. 23, 1954 |